US007659875B2

(12) United States Patent
Miyazaki

(10) Patent No.: US 7,659,875 B2
(45) Date of Patent: Feb. 9, 2010

(54) GRADATION DISPLAY REFERENCE VOLTAGE GENERATING CIRCUIT AND LIQUID CRYSTAL DRIVING DEVICE

(75) Inventor: Eisaku Miyazaki, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 594 days.

(21) Appl. No.: 11/447,098

(22) Filed: Jun. 6, 2006

(65) Prior Publication Data

US 2006/0274005 A1 Dec. 7, 2006

(30) Foreign Application Priority Data

Jun. 7, 2005 (JP) ............................ 2005-166688

(51) Int. Cl.
*G09G 3/36* (2006.01)
*G09G 5/00* (2006.01)
*G09G 5/10* (2006.01)
*G06F 3/038* (2006.01)

(52) U.S. Cl. .......................... 345/89; 345/690; 345/212

(58) Field of Classification Search .................. 345/55, 345/87, 89

See application file for complete search history.

(56) References Cited

U.S. PATENT DOCUMENTS

| | | | | |
|---|---|---|---|---|
| 5,640,174 | A | 6/1997 | Kamei et al. | |
| 5,886,679 | A | 3/1999 | Matsuda et al. | |
| 6,538,630 | B1 | 3/2003 | Tanaka et al. | |
| 7,046,223 | B2 | 5/2006 | Hashimoto | |
| 7,079,127 | B2 * | 7/2006 | Morita | 345/212 |
| 2003/0151577 | A1 | 8/2003 | Morita | |
| 2004/0179027 | A1 * | 9/2004 | Nakai et al. | 345/690 |

FOREIGN PATENT DOCUMENTS

| | | |
|---|---|---|
| JP | 8263013 | 10/1996 |
| JP | 8272339 | 10/1996 |
| JP | 11-202299 | 7/1999 |
| JP | 11272243 | 10/1999 |
| JP | 2002-215108 | 7/2002 |
| JP | 2003-233357 | 8/2003 |
| KR | 2004-100559 | 12/2004 |

* cited by examiner

*Primary Examiner*—Sumati Lefkowitz
*Assistant Examiner*—Charles Hicks
(74) *Attorney, Agent, or Firm*—Harness, Dickey & Pierce, P.L.C.

(57) ABSTRACT

In a gradation display reference voltage generating circuit, first reference voltages (VH0 to VH63) produced by resistors for positive polarity (RH0 to RH64) of a first ladder circuit in a first reference voltage producing section (LDH) are output from reference voltage output terminals (T0 to T63), respectively, at the positive polarity drive, while second reference voltages (VL0 to VL63) produced by resistors for negative polarity (RL0 to RL64) of a second ladder circuit in a second reference voltage producing section (LDL) are output from the reference voltage outputs (T0 to T63), respectively, at the negative polarity drive. A resistance ratio of the resistors for positive polarity (RH0 to RH64) is different from a resistance ratio of the resistors for negative polarity (RL0 to RL64).

7 Claims, 11 Drawing Sheets

GRADATION DISPLAY REFERENCE VOLTAGE GENERATING CIRCUIT AND LIQUID CRYSTAL DRIVING DEVICE

CROSS-REFERENCE TO RELATED APPLICATIONS

This nonprovisional application claims priority under 35 U.S.C. §119(a) on Patent Application No. 2005-166688 filed in Japan on Jun. 7, 2005, the entire contents of which are hereby incorporated by reference.

BACKGROUND OF THE INVENTION

The present invention relates to a gradation display reference voltage generating circuit and a liquid crystal driving device, and in particular to a gradation display reference voltage generating circuit used for a liquid crystal display device employing a line inversion method, and a liquid crystal driving device using it.

Conventionally, there is a gradation display reference voltage generating circuit using intermediate voltages obtained by resistance division for driving the liquid crystal in an active matrix liquid crystal display device (see, for example, JP 11-272243 A).

In the gradation display reference voltage generating circuit, the resistors used for resistance division have a resistance ratio called gamma (γ) correction, and the optical characteristic of the liquid crystal material is corrected according to the resistance ratio in order to achieve more natural gradation display.

The configuration of a liquid crystal display device comprising the gradation display reference voltage generating circuit, the configuration of a thin film transistor (TFT) liquid crystal panel in the liquid crystal display device, liquid crystal driving waveforms for the liquid crystal panel, and the configuration of source drivers for the liquid crystal panel will be described below.

FIG. 6 is a block diagram showing the configuration of a TFT liquid crystal display device which is a typical example of a conventional active matrix liquid crystal display device. The liquid crystal display device consists of a liquid crystal display section and a liquid crystal driving circuit (liquid crystal driving section) for driving it. The liquid crystal display section has a TFT liquid crystal panel 101. In the liquid crystal panel 101, liquid crystal display elements (not shown) and a counter electrode (common electrode) 102 described later in detail are provided.

On the other hand, the liquid crystal driving circuit includes a source driver section 103 and a gate driver section 104 constituted by integrated circuits (ICs), a controller 105, and a liquid crystal driving power supply 106. The controller 105 enters display data D and a control signal S1 into the source driver section 103, while entering a control signal S2 into the gate driver section 104. The controller 105 also enters a horizontal synchronizing signal (not shown) into the source driver section 103 and the gate driver section 104.

In the liquid crystal display device configured as described above, display data entered into the device from the outside is supplied to the source driver section 103 as digital signal display data D through the controller 105. The source driver section 103 timeshares the input display data D so as for the display data to be latched in the 1st source driver SD11 to the nth source driver SD1*n*, and then carries out digital-analog (D/A) conversion of the display data in synchronization with the horizontal synchronizing signal. Analog voltages for gradation display (referred to as "gradation display voltages" hereinafter) obtained by D/A conversion of the timeshared display data D are output to corresponding liquid crystal display elements in the liquid crystal panel 101 through source signal lines (not shown).

FIG. 7 shows the configuration of the liquid crystal panel 101 shown in FIG. 6. The liquid crystal panel 101 is provided with pixel electrodes 111, pixel capacitors 112, TFTs 113 for on/off control of application of voltages to the pixel electrodes 111, source signal lines 114, gate signal lines 115, and a counter electrode 116 (corresponding to the counter electrode 102 shown in FIG. 6). In this configuration, a liquid crystal display element A for one pixel consists of a pixel electrode 111, a pixel capacitor 112 and a TFT 113.

Gradation display voltages described above corresponding to the brightness levels of pixels as displaying objects are supplied from the source driver section 103 in FIG. 6 to the source signal lines 114. On the other hand, scanning signals for successively turning on TFTs 113 arranged in the column direction are supplied from the gate driver section 104 to the gate signal lines 115. Then, through the TFTs 113 in the ON state, the gradation display voltages of the source signal lines 114 are applied to the pixel electrodes 111 connected with the drains of the TFTs 113, so that the pixel capacitors 112 between the pixel electrodes 111 and the counter electrode 116 are charged. Thus, the light transmittance of the liquid crystal is changed according to the gradation display voltages, providing pixel display.

FIGS. 8 and 9 each show an example of a liquid crystal driving waveform (The figures show cases that the voltage of the counter electrode is constant in order to illustrate that electric charge is stored into a pixel capacitor for display. The display principles in these cases are similar to that in a line inversion method of inverting the polarity of the counter electrode described later although the waveforms are different from those in the line inversion method). In FIGS. 8 and 9, the reference numerals 121, 125 each denote a driving waveform of the source driver section 103 (shown in FIG. 6), while the reference numerals 122, 126 each denote a driving waveform of the gate driver section 104. Furthermore, the reference numerals 123, 127 each denote an electric potential of the counter electrode 116, and the reference numerals 124, 128 each denote a voltage waveform of a pixel electrode 111. A voltage applied to the liquid crystal material is an electric potential difference between a pixel electrode 111 and the counter electrode 116, and is indicated by hatched lines in the figure.

For example, in the case of FIG. 8, a TFT 113 (shown in FIG. 7) is turned on only for a period of time during which the driving waveform 122 of the gate driver section 104 (shown in FIG. 6) is at the "high level", so that a voltage which is the difference between the potential of the driving waveform 121 of the source driver section 103 and the potential 123 of the counter electrode 116 is applied to the pixel electrode 111. Consequently, the driving waveform 122 of the gate driver section 104 becomes the "low level", so that the TFT 113 is turned off. In this case, the above voltage is maintained because of the existence of the pixel capacitor 112 in the pixel.

The same thing can be said for the case of FIG. 9. However, the voltage applied to the liquid crystal material in the case of FIG. 8 is different from that in the case of FIG. 9, and the applied voltage in the case of FIG. 8 is higher than that in the case of FIG. 9. As is apparent from above, the voltage applied to the liquid crystal material is varied as an analog voltage, so that the light transmittance of the liquid crystal is varied in an analog fashion, realizing multi-gradation display. In this connection, the number of possible gradations for display is dependent on the number of analog voltages to be selectively applied to the liquid crystal material.

FIG. 10 is a block diagram of one of the 1st to nth source drivers SD11 to SD1*n* shown in FIG. 6. Input digital signal display data D includes R (red), G (green), and B (blue) display data (DR, DG, and DB). The display data D is once latched by the input latch circuit 131 and is then stored in the sampling memory 133 by time sharing in synchronization with the operation of the shift register 132 shifted by the control signal S1 (start pulse SP and clock CK) from the controller 105 (shown in FIG. 6). The stored display data is then transferred to the hold memory 134 by one operation based on the horizontal synchronizing signal (not shown) from the controller 105. The notation S denotes a cascade output.

The gradation display reference voltage generating circuit 139 shown in FIG. 10 generates reference voltages of various levels based on a voltage VR supplied from an external reference voltage generating circuit (corresponding to the liquid crystal driving power supply 106 in FIG. 6). Data in the hold memory 134 is sent out to the digital-analog (D/A) conversion circuit 136 through the level shifter circuit 135 and is then converted to analog voltages based on the reference voltages of various levels received from the gradation display reference voltage generating circuit 139. The analog voltages are output as the gradation display voltages, by the output circuit 137, from the liquid crystal driving voltage output terminal 138 to the source signal lines 114 of the liquid crystal display elements A (shown in FIG. 7). That is, the number of levels of the reference voltages results in the aforementioned number of possible gradations for display.

FIG. 11 shows the configuration of the gradation display reference voltage generating circuit 139 for generating a plurality of reference voltages as described above to produce intermediate voltages. The gradation display reference voltage generating circuit 139 in FIG. 11 is designed to generate 64 levels of reference voltages.

The gradation display reference voltage generating circuit 139 consists of 9 halftone voltage input terminals indicated by V0, V8, V16, V24, V32, V40, V48, V56 and V63, resistance elements R0 to R7 having a resistance ratio for γ correction, and 64 resistors (not shown) connected eight by eight in series between both terminals of each of the resistance elements R0 to R7. As described above, a resistance ratio called γ correction is stored in the source driver section 103, providing the liquid crystal driving output voltage for conversion of display data to the gradation display voltages with a polygonal line characteristic. Thus, the optical characteristic of the liquid crystal material is corrected with the resistance ratio, so that natural gradation display which matches the optical characteristic of the liquid crystal material can be achieved. An example of the characteristic of the liquid crystal driving output voltage of the conventional gradation display reference voltage generating circuit 139 is shown in FIG. 12. In FIG. 12, the horizontal axis indicates the gradation display data (digital input), and the vertical axis indicates the liquid crystal driving output voltage (analog voltage).

By the way, in the case of display by liquid crystal, the liquid crystal must be driven in an alternating fashion, that is, by voltages the polarities of which vary alternately such that burn-in is prevented. Methods of driving TFT liquid crystal in an alternating fashion mainly include a line inversion method and a dot inversion method.

In the line inversion method, a liquid display line is driven by voltages having the same polarity, and the next line is driven by voltages having a polarity opposite to those of the preceding line. In the dot inversion method, the polarities of driving voltages vary between adjacent pixels of the liquid crystal. In the line inversion method, the polarity of the counter electrode (an electrode common to the liquid crystal pixels) is inverted every drive line, so that the driving voltage of the liquid crystal driver can be of the order of 5 V.

On the other hand, in the dot inversion method, it is necessary to change the polarity every output of the source driver, so that the driving voltage is required to be of the order of plus 5 V to minus 5 V (10 V in total).

In the dot inversion method, the current consumption becomes large by the high voltage as described above, and therefore various methods of reducing the current have been proposed. For example, in JP 8-263013 A, a method is described in which taking advantage of the fact that the output polarity of each of the lines of the source driver is inverted and is different from those of adjacent output terminals, when the output polarities are changed, short circuits are established between output terminals to neutralize the electric charges of the loads connected with the output terminals in order to reduce the electric currents passing through the loads when voltages having inverse polarities are applied to the loads. Furthermore, in JP 8-272339 A, a method is described in which the outputs are once made to be at the ground level at polarity inversion to reduce the current consumption.

In contrast to this, in the line inversion method, there is an advantage that the current consumption becomes lower by the low voltage and there is no difference in polarity between adjacent output terminals unlike the dot inversion method, so that it is not necessary to establish short circuits between adjacent output terminals at polarity inversion or to bring the output terminals to the GND level during polarity inversion as in the dot inversion method.

When liquid crystal is driven by the line inversion method, it is necessary to invert the polarity of a liquid crystal driving voltage for each of the lines. Polarity inversion is made in such a manner that voltages for various gradations are made by resistance division of a liquid crystal driving voltage, and the voltage between both ends of the resistors for the resistance division is changed, or the gradation selection signal data is inverted. For polarity inversion by such a method, it is required that gamma (γ) characteristics before and after the polarity inversion are almost equal.

In a gradation display reference voltage generating circuit having only one circuit for producing gradation display voltages, however, if the γ characteristic of the panel in the positive polarity is different from that in the negative polarity, the output voltages for the gradation display voltages should be corrected every polarity inversion, or should be adjusted to be at levels causing no display problem in both of the positive and negative polarities. For this reason, it is necessary to provide, as shown in FIG. 11, a plurality of intermediate voltage input terminals (V0, V8, V16, V24, V32, V40, V48, V56, and V63) to input correction voltages from the outside in order to correct the output voltages to voltages which match the γ characteristics.

SUMMARY OF THE INVENTION

To solve the above problem, a gradation display reference voltage generating circuit may be used in which two liquid crystal driving voltage producing circuits are integrated for polarity inversion, and separate resister division circuits are used for each of the polarities. The gradation display reference voltage generating circuit in which two liquid crystal driving voltage producing circuits are used for polarity inversion has been mentioned just in order to facilitate the understanding of the present invention, but is neither a publicly known technology nor a conventional technology.

However, if the resistive material for resistance division is not designed to have a certain width, the resistance values vary greatly due to manufacturing variations. In order to reduce the through current, it is necessary to increase the resistance value, and if the width of the resistor is kept in consideration of the variation, it is necessary to increase the length of the resistor, thereby increasing the footprint, or installation area of the resistor.

For this reason, in consideration of the variation accuracy and the footprint, it is not possible to increase the resistance value, and if two resistance division circuits are used, the through current flowing through two resistance division circuits is twice as large as the through current flowing through one resistance division circuit.

Furthermore, wirings for supplying gradation display voltages produced by the resistance division circuits to the digital-analog (D/A) converters provided at the outputs are required, so that if the number of outputs and/or the number of gradations increase, the area of the wirings increases, and the parasitic capacitance of the wirings thus increases. For this reason, there is a problem that the current consumption caused by polarity change increases, thereby negating the advantage in adopting the line inversion drive.

It is therefore an object of the present invention to provide a gradation display reference voltage generating circuit which has a smaller footprint of circuits for resistance division and a lower power consumption, and which can obtain gradation display voltages most suitable for each of the positive polarity drive and the negative polarity drive which are different in characteristic, and a liquid crystal driving device having the gradation display reference voltage generating circuit.

In order to accomplish the above object, there is provided, according to the present invention, a gradation display reference voltage generating circuit for generating reference voltages for gradation display used for digital-to-analog conversion of display data, comprising:

a first reference voltage producing section for producing a plurality of first reference voltages for positive polarity drive with respect to a reference potential of a displaying object;

a second reference voltage producing section for producing a plurality of second reference voltages for negative polarity drive which are opposite in polarity to the plurality of first reference voltages produced by the first reference voltage producing section; and a plurality of reference voltage outputs for outputting the plurality of first reference voltages from the first reference voltage producing section at the positive polarity drive, while outputting the plurality of second reference voltages from the second reference voltage producing section at the negative polarity drive, the first reference voltage producing section comprising a first ladder resistor circuit in which a plurality of first resistance elements are connected in series between two different power supplies and which produces the plurality of first reference voltages by resistance division of a difference in voltage between the two power supplies by the plurality of first resistance elements, and the second reference voltage producing section comprising a second ladder resistor circuit in which a plurality of second resistance elements are connected in series between the two power supplies and which produces the plurality of second reference voltages by resistance division of the difference in voltage between the two power supplies by the plurality of second resistance elements.

The "reference potential of a displaying object" herein means a potential of, for example, a counter electrode (i.e., a common electrode) of crystal liquid display elements.

In the gradation display reference voltage generating circuit with the above configuration, the plurality of first reference voltages produced by resistance division by the plurality of first resistance elements of the first ladder resistor circuit of the first reference voltage producing section are output from the plurality of reference voltage outputs at the positive polarity drive, while the plurality of second reference voltages produced by resistance division by the plurality of second resistance elements of the second ladder resistor circuit of the second reference voltage producing section are output from the plurality of reference voltage outputs at the negative polarity drive. Like this, two reference voltage producing sections for producing liquid crystal driving voltages are provided for polarity inversion, and at the positive polarity drive or the negative polarity drive in which one of the reference voltage producing sections is involved, the operation of the other reference voltage producing section unnecessary at the drive is stopped, whereby reference voltages of different characteristics corresponding to the positive polarity and the negative polarity are output and still the current consumption is reduced. Thus, the footprint of the resistance division circuit and the power consumption can be reduced. In addition, in the gradation display reference voltage generating circuit, even if the γ characteristic at the negative polarity drive is different from that at the positive polarity drive, gradation display voltages most suitable for each of the positive polarity drive and the negative polarity drive can be obtained without correcting the gradation display voltages every polarity inversion or adjusting them to levels without problem in either polarity. Furthermore, since the gradation display reference voltage generating circuit has the first and second ladder resistor circuits for producing reference voltages for the positive polarity drive and reference voltages for the negative polarity drive, respectively, the gradation display voltages can be correctly suited to the positive polarity characteristic and the negative polarity characteristic. Furthermore, since it is not required to input intermediate voltages to correct the output voltage characteristic, reference power supply circuits and input terminals for intermediate voltages are not required In one embodiment, a resistance ratio of the plurality of first resistance elements of the first ladder resistor circuit is different from a resistance ratio of the plurality of second resistance elements of the second ladder resistor circuit.

In this embodiment, the resistance ratio of the resistors for positive polarity of the first ladder resistor circuit is different from the resistance ratio of the resistors for negative polarity of the second ladder resistor circuit, so that gradation display voltages most suitable for each of the γ characteristic at the positive polarity drive and the γ characteristic at the negative polarity drive can be obtained.

In one embodiment, the gradation display reference voltage generating circuit further includes a first power supply isolation section for isolating the power supplies from both ends of the first ladder resistor circuit of the first reference voltage producing section; and a second power supply isolation section for isolating the power supplies from both ends of the second ladder resistor circuit of the second reference voltage producing section.

In this embodiment, the power supplies connected with both ends of the first ladder resistor circuit of the first reference voltage producing section are isolated from the first ladder resistor circuit by the first power supply isolation section, and the power supplies connected with both ends of the second ladder resistor circuit of the second reference voltage producing section are isolated from the second ladder resistor circuit by the second power supply isolation section, so that the through current can be reduced and thus the power consumption can be reduced.

In one embodiment, during a predetermined isolation period upon switching between the positive polarity drive and the negative polarity drive, the first power supply isolation section isolates the power supplies from both ends of the first ladder resistor circuit of the first reference voltage producing section, and the second power supply isolation section isolates the power supplies from both ends of the second ladder resistor circuit of the second reference voltage producing section.

In one embodiment, the gradation display reference voltage generating circuit further includes a plurality of first outputs provided at the first reference voltage producing section to output the plurality of first reference voltages; a plurality of second outputs provided at the second reference voltage producing section to output the plurality of second reference voltages; a first output isolation section for isolating the plurality of first outputs of the first reference voltage producing section from the plurality of reference voltage outputs; and a second output isolation section for isolating the plurality of second outputs of the second reference voltage producing section from the plurality of reference voltage outputs.

In this embodiment, the first outputs of the first reference voltage producing section for outputting the first reference voltages are isolated from the reference voltage outputs by the first output isolation section, and the second outputs of the second reference voltage producing section for outputting the second reference voltages are isolated from the reference voltage outputs by the second output isolation section, so that the output current can be reduced and thus the power consumption can be reduced.

In one embodiment, during a predetermined isolation period upon switching between the positive polarity drive and the negative polarity drive, the first output isolation section isolates the plurality of first outputs of the first reference voltage producing section from the plurality of reference voltage outputs, and the second output isolation section isolates the plurality of second outputs of the second reference voltage producing section from the plurality of reference voltage outputs.

In one embodiment, the gradation display reference voltage generating circuit further includes a short-circuit section for establishing short circuits between adjacent ones of the plurality of reference voltage outputs during a predetermined short-circuit period upon switching between the positive polarity drive and the negative polarity drive.

In this embodiment, during the predetermined short-circuit period upon switching between the positive polarity drive and the negative polarity drive, short circuits are established between adjacent ones of the reference voltage outputs to distribute the electric charges of the gradation display voltages produced by resistance division, so that the charging/discharging currents from the reference power supplies generated at polarity inversion can be reduced.

A liquid crystal driving device according to the present invention includes any one of the above-described gradation display reference voltage generating circuits.

The liquid crystal driving device as configured above allows lower power consumption and higher display quality.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

A gradation display reference voltage generating circuit and a liquid crystal driving device according to the present invention will be described in detail below based on the embodiments shown in the figures.

Figure 1:
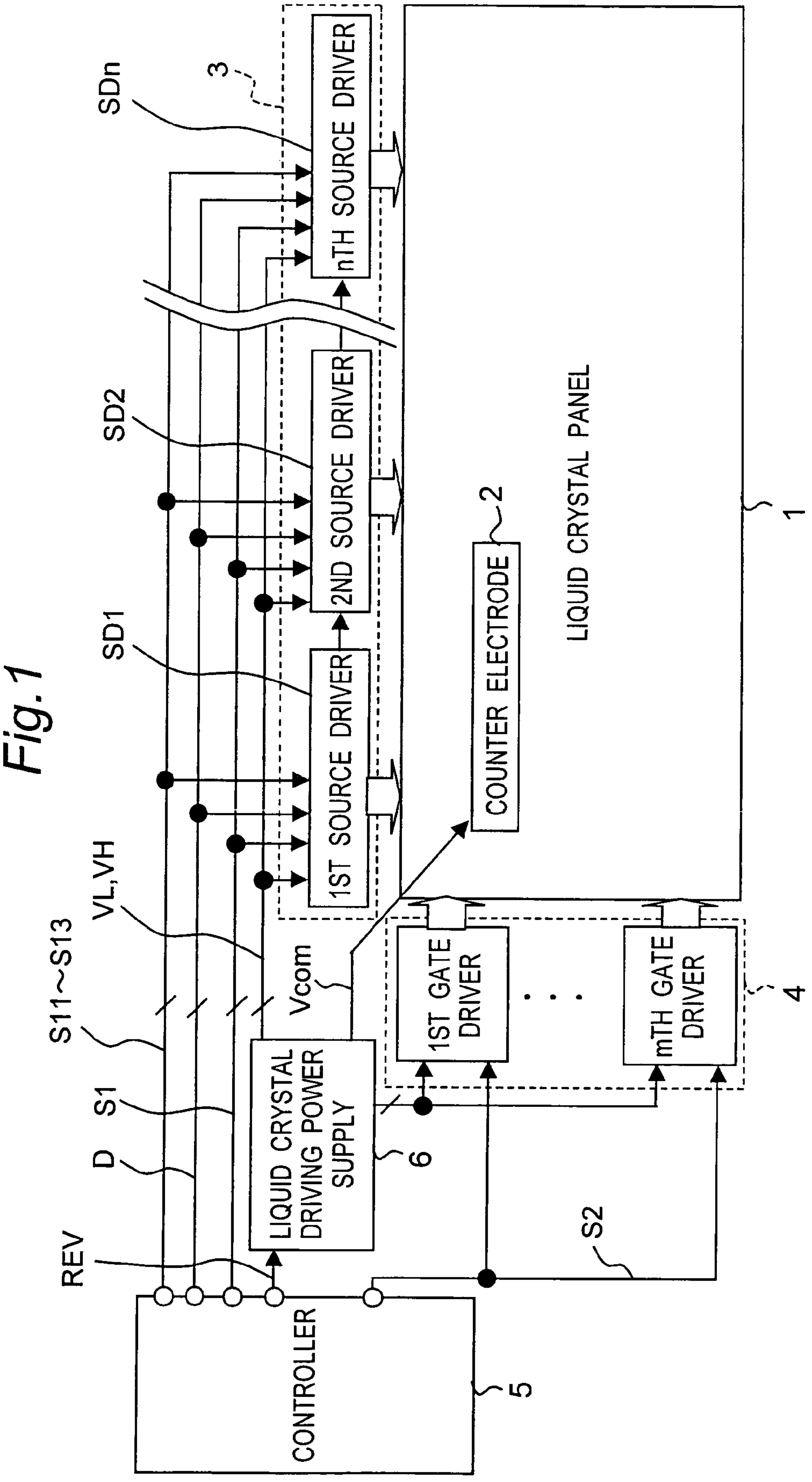
FIG. 1 is a block diagram showing the configuration of a liquid crystal display device having a liquid crystal driving device that includes a gradation display reference voltage generating circuit according to an embodiment of the present invention.

FIG. 1 is a block diagram showing the configuration of a liquid crystal display device having a liquid crystal driving device that employs a gradation display reference voltage generating circuit according to an embodiment of the present invention.

The liquid crystal display device has a TFT liquid crystal panel 1, a counter electrode 2 in the liquid crystal panel 1, a source driver section 3, a gate driver section 4, a controller 5, and a liquid crystal driving power supply 6. The source driver section 3, the gate driver section 4, the controller 5, and the liquid crystal driving power supply 6 constitute a liquid crystal driving device.

The controller 5 enters display data D and control signals S1 and S11 to S14 into the source driver section 3, while entering a control signal S2 into the gate driver section 4. Furthermore, the liquid crystal driving power supply 6 supplies voltages VH and VL to the source driver section 3, while supplying a voltage to the gate driver section 4, and applies a common potential Vcom based on a polarity inversion signal REV to the counter electrode 2.

In the liquid crystal display device configured as described above, display data entered into the device from the outside is entered into the source driver section 3 as digital signal display data D through the controller 5 in synchronization with the control signal S1. The source driver section 3 latches the entered display data D in a 1st source driver SD1 to an nth source driver SDn by time sharing, and then carries out D/A conversion of the display data in synchronization with a signal produced in synchronization with a horizontal synchronizing signal (not shown) entered from the controller 5. Gradation display voltages produced by D/A conversion of the display data D are output to corresponding liquid crystal display elements in the liquid crystal panel 1 through source signal lines (not shown).

Figure 2:
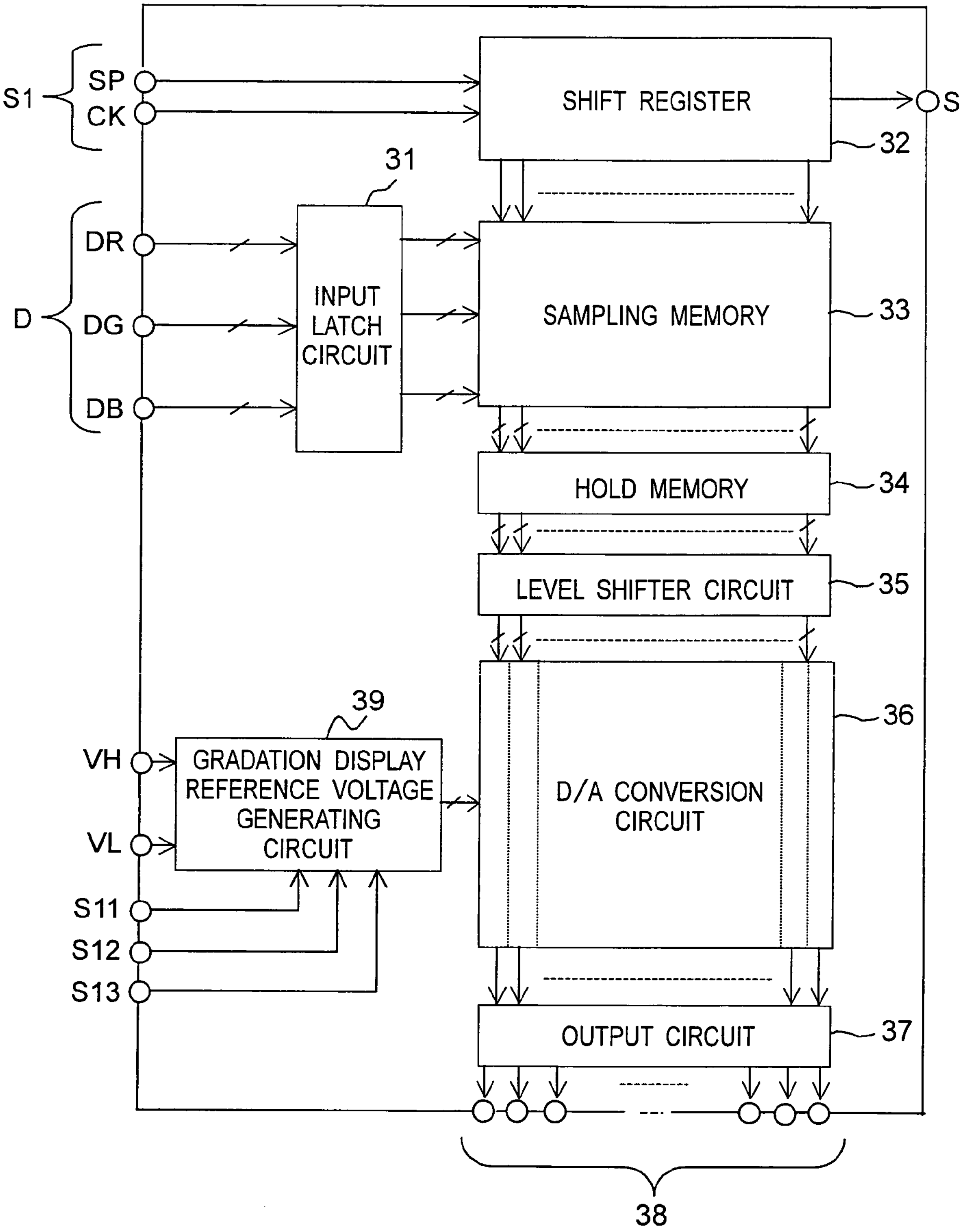
FIG. 2 is a block diagram of a source driver of the liquid crystal driving device.

FIG. 2 is a block diagram of one of the 1st to nth source drivers SD1 to SDn shown in FIG. 1. Entered digital signal display data D includes R (red), G (green), and B (blue) display data (DR, DG, and DB). The display data D is once latched by an input latch circuit 31 and is then stored in a sampling memory 33 by time sharing in synchronization with the operation of a shift register 32, which is shifted by the control signal S1 (start pulse SP and clock CK) from the controller 5 (shown in FIG. 1). After that, the stored display data is collectively transferred to a hold memory 34 in response to the horizontal synchronizing signal (not shown) from the controller 5. The symbol S denotes a cascade output.

Figure 7:
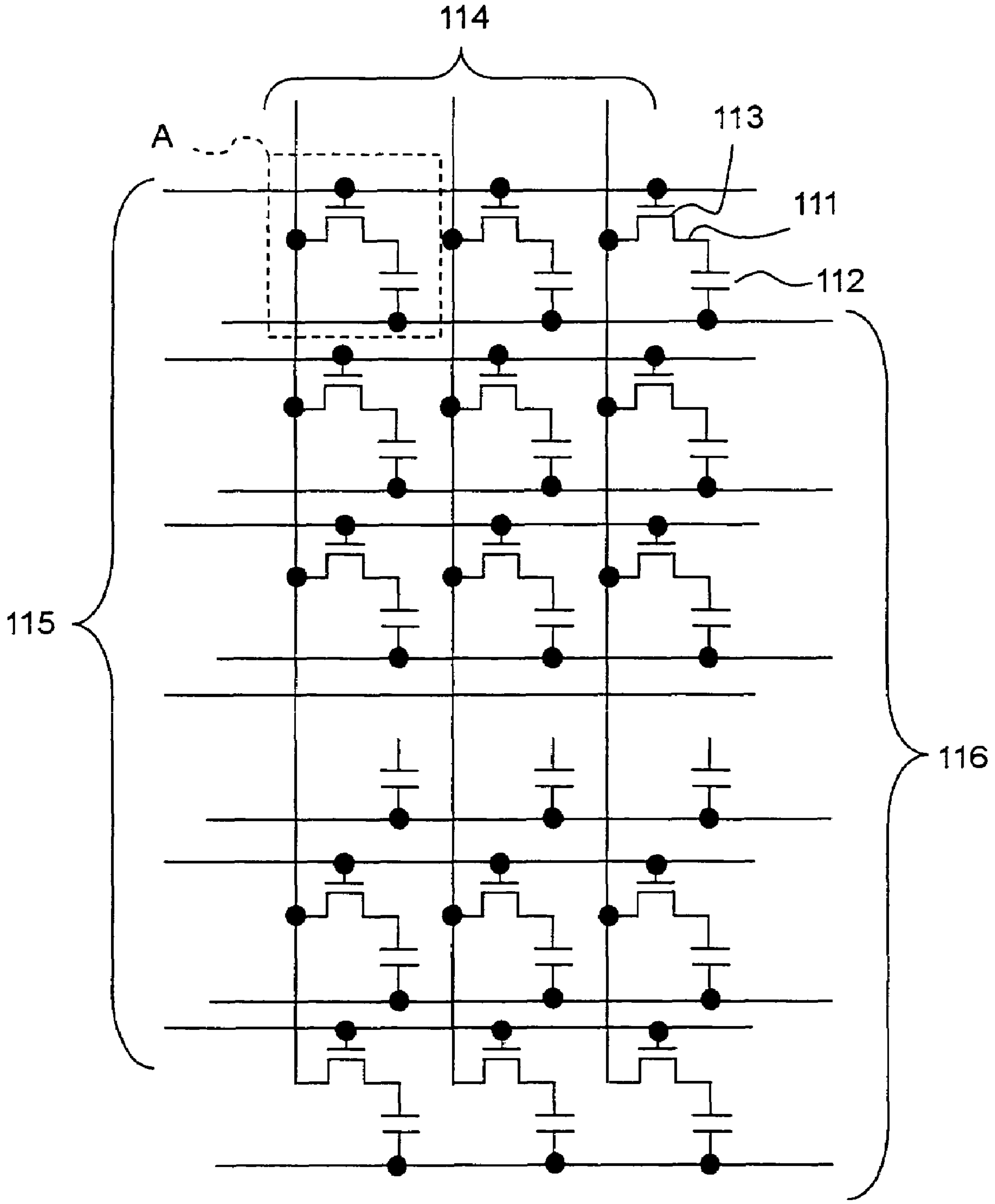
Fig.7 BACKGROUND ART
FIG. 7 shows the configuration of the liquid crystal panel of the liquid crystal display device.
Figure 8:
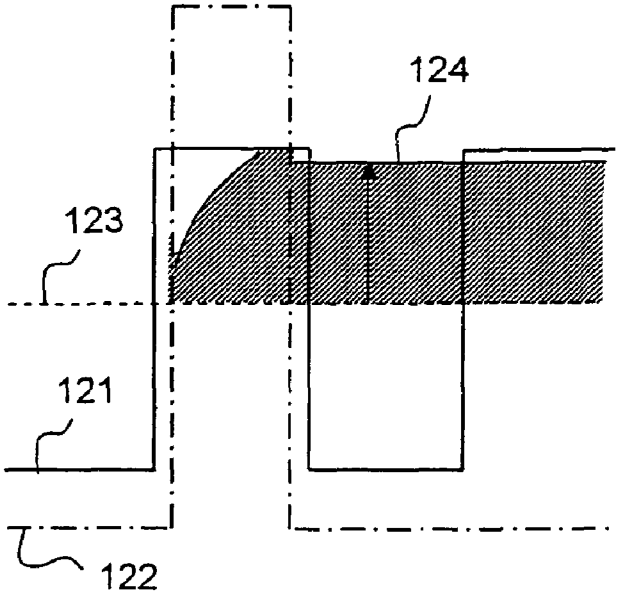
Fig.8 BACKGROUND ART
FIG. 8 shows an example of a liquid crystal driving waveform of the liquid crystal display device.
Figure 9:
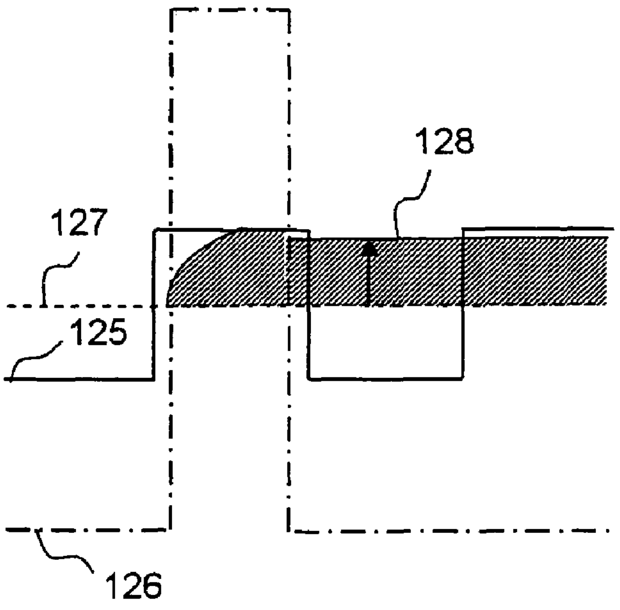
Fig.9 BACKGROUND ART
FIG. 9 is another example of a liquid crystal driving waveform of the liquid crystal display device.
Figure 10:
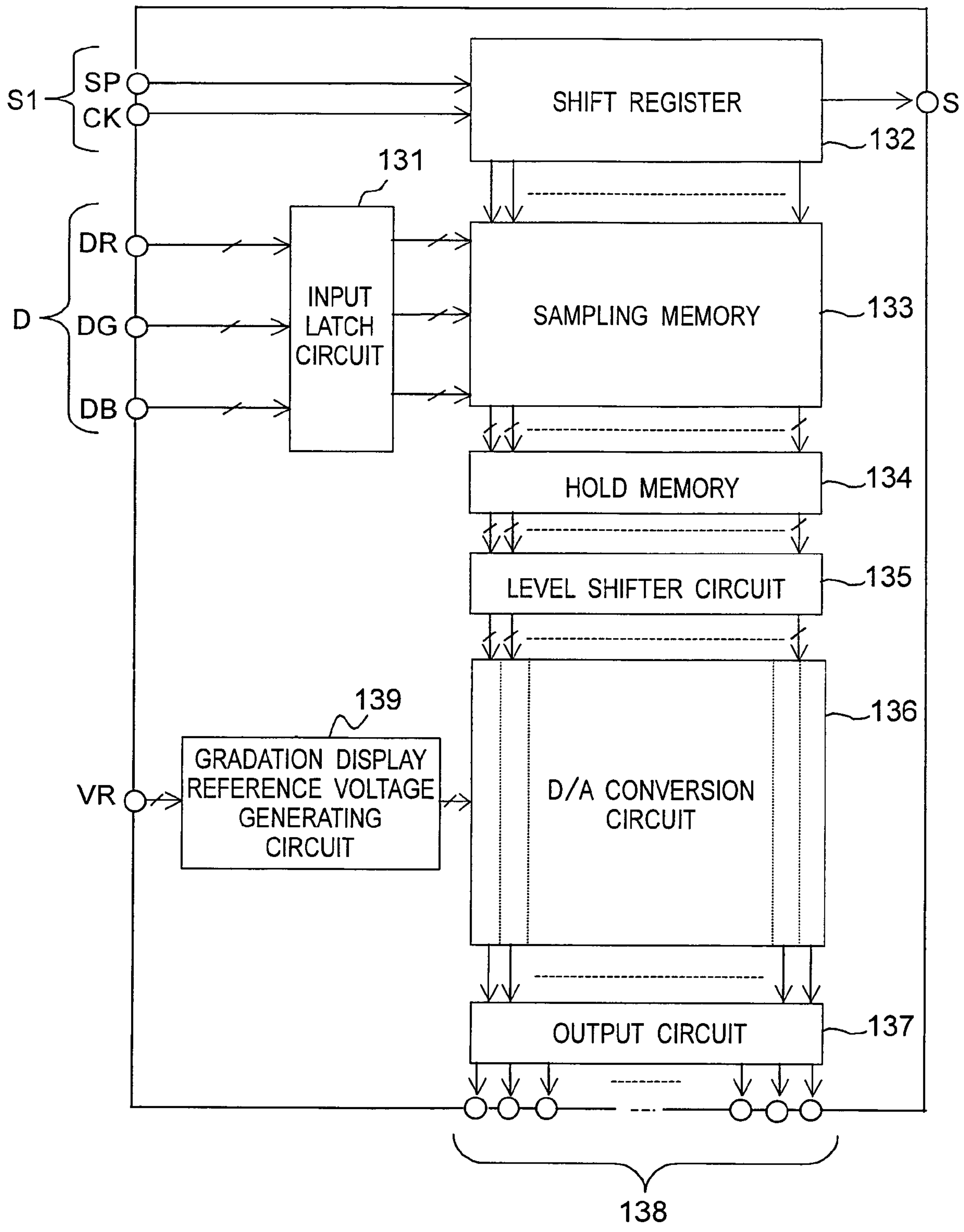
Fig.10 BACKGROUND ART
FIG. 10 is a block diagram of a source driver of the liquid crystal display device.

The gradation display reference voltage generating circuit 39 shown in FIG. 2 generates various levels of reference voltages based on the reference power supplies VH and VL received from an external reference voltage generating circuit (corresponding to the liquid crystal driving power supply 6 in FIG. 1). Data in the hold memory 34 is sent to a digital-analog (D/A) conversion circuit 36 through a level shifter circuit 35 and is then converted to analog voltages based on the various levels of the reference voltages received from the gradation display reference voltage generating circuit 39. The analog voltages are output, by an output circuit 37, from liquid crystal driving voltage output terminals 38 to the source signal lines 14 of the liquid crystal display elements A (see FIG. 7) as gradation display voltages described above. The number of levels of the reference voltages obtained this time results in the number of possible gradations for display.

Figure 3:
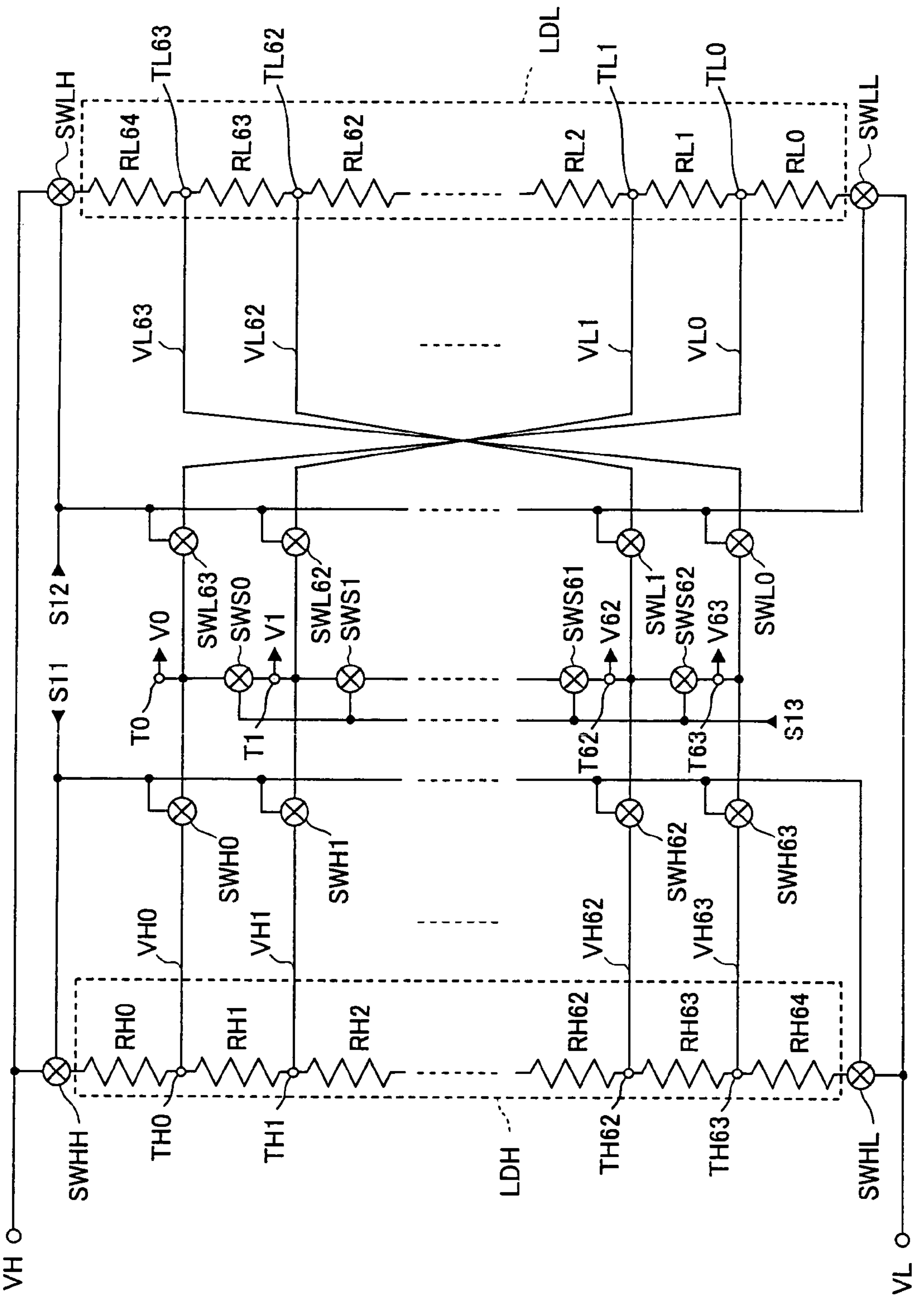
FIG. 3 is a block diagram of the gradation display reference voltage generating circuit of the source driver.

FIG. 3 shows the gradation display reference voltage generating circuit 39.

As shown in FIG. 3, there is provided between the power supply VH and the power supply VL a first reference voltage producing section LDH having a first ladder resistor circuit in which resistors RH0 to RH64 for positive polarity as an example of a plurality of first resistance elements are connected in series. Resistance division by the resistors RH0 to RH64 for positive polarity of the first reference voltage producing section LDH produces a plurality of first reference voltages VH0 to VH63. The resistor RH0 for positive polarity is connected with the reference power supply VH via an analog switch SWHH. On the other hand, the resistor RH64 for positive polarity is connected with the reference power supply VL via an analog switch SWHL. The analog switches SWHH and SWHL constitute a first power supply isolation section, and are controlled with the control signal S11. Furthermore, the first reference voltages VH0 to VH63 are output from a plurality of first output terminals TH0 to TH63 which are connection points between the adjacent resistors for positive polarity RH0 and RH1, RH1 and RH2, . . . , and RH63 and RH64, respectively. The plurality of first output terminals TH0 to TH63 for outputting the first reference voltages VH0 to VH63 are connected with analog switches SWH0 to SWH63, respectively, at one end of each of the analog switches. The analog switches SWH0 to SWH63 constitute a first output isolation section, and are controlled with the control signal S11. The analog switches SWH0 to SWH63 are also connected, at another end of each of the analog switches, with reference voltage output terminals T0 to T63 for outputting the reference voltages V0 to V63, respectively.

As also shown in FIG. 3, there is provided between the power supply VH and the power supply VL a second reference voltage producing section LDL having a second ladder resistor circuit in which resistors RL64 to RL0 for negative polarity as an example of a plurality of second resistance elements are connected in series. Resistance division by the resistors RL64 to RL0 for negative polarity of the second reference voltage producing section LDL produces a plurality of second reference voltages VL63 to VL0. The resistor RL64 for negative polarity is connected with the reference power supply VH through an analog switch SWLH. On the other hand, the resistor RL0 for negative polarity is connected with the reference power supply VL through an analog switch SWLL. The analog switches SWLH and SWLL constitute a second power supply isolation section, and are controlled with the control signal S12. Furthermore, the second reference voltages VL63 to VL0 are output from a plurality of second output terminals TL63 to TL0 which are connection points between the adjacent resistors for negative polarity RL64 and RL63, RL63 and RL62, . . . , and RL1 and RL0, respectively. The plurality of second output terminals TL63 to TL0 for outputting the second reference voltages VL63 to VL0 are connected with analog switches SWL0 to SWL63, respectively, at one end of each of the analog switches. The analog switches SWL0 to SWL63 constitute a second output isolation section, and are controlled with the control signal S12. The analog switches SWL63 to SWL0 are also connected, at another end of each of the analog switches, with the reference voltage output terminals T0 to T63 for outputting the reference voltages V0 to V63, respectively.

Furthermore, the adjacent reference voltage output terminals T0 and T1, T1 and T2, . . . , and T62 and T63 are connected through analog switches SWS0, SWS1, . . . , and SWS62, respectively. The analog switches SWS0 to SWS62 constitute a short-circuit section, and are controlled with the control signal S13.

Figure 4:
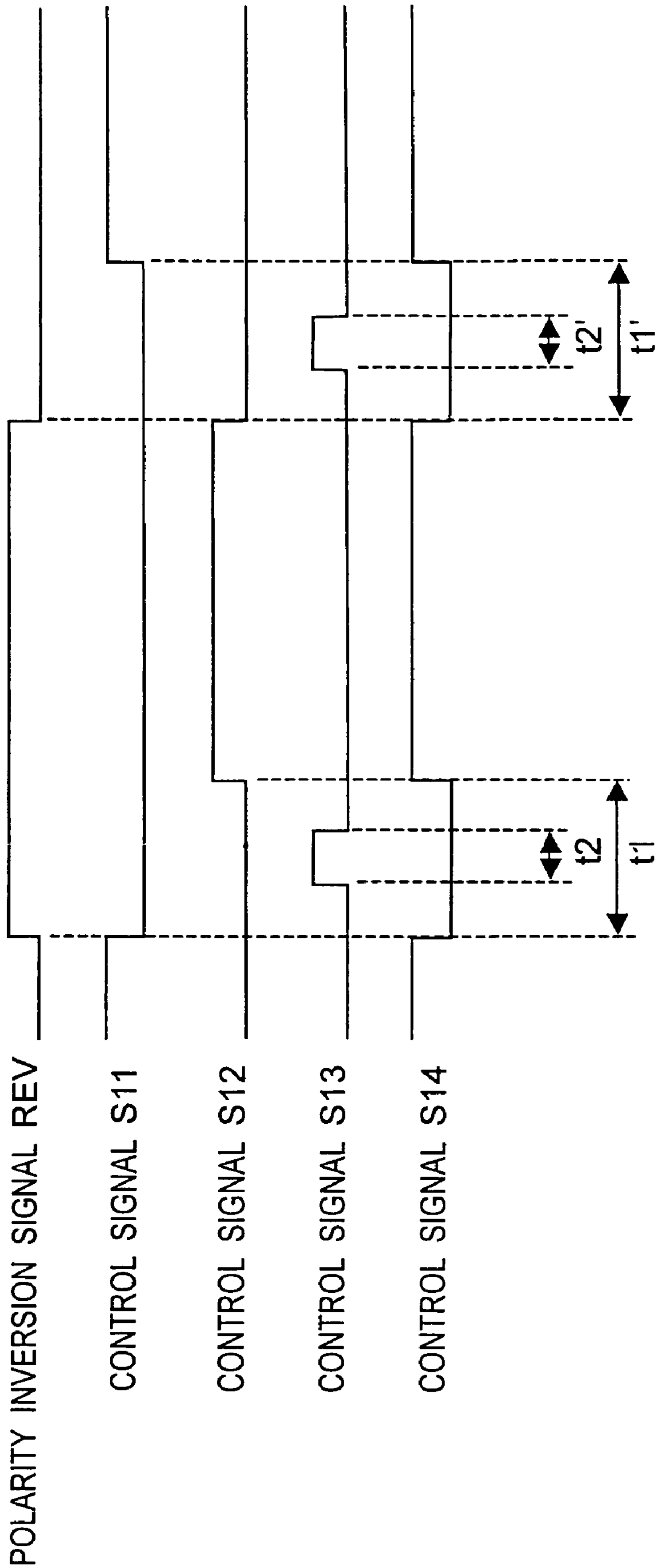
FIG. 4 is a timing chart of the gradation display reference voltage generating circuit.

FIG. 4 is a timing chart of the gradation display reference voltage generating circuit 39. The polarity inversion signal REV shown in FIG. 4 is a signal the polarity of which is inverted every horizontal synchronizing period, and is produced from the horizontal synchronizing signal in the controller 5. Also, in the controller 5, the control signal S11 is produced by a logical AND between the inversion of the polarity inversion signal REV and the control signal S14, and the control signal S12 is produced by a logical AND between the polarity inversion signal REV and the control signal S14. Furthermore, the control signals S13 and S14 are produced from the leading edge and the trailing edge of the polarity inversion signal REV using a delay circuit in the controller 5.

As shown in FIG. 4, in a period in which the polarity inversion signal REV is at the low level (i.e., at the positive polarity drive), the control signal S11 is at the high level, and the analog switches SWHH, SWHL, and SWH0 to SWH63 are in the ON positions. Thus, the first output terminals TH0 to TH63 of the resistors for positive polarity RH0 to RH64 are connected with the reference voltage output terminals T0 to T63, respectively, so that voltages corresponding to the resistance ratio of the resistors for positive polarity RH0 to RH64 are output from the reference voltage output terminals T0 to T63, respectively. At that time, as shown in FIG. 4, the control signal S12 is at the low level, and the analog switches SWL63 to SWL0 are in the OFF positions, so that the resistors for negative polarity RL64 to RL0 are isolated from the reference voltage output terminals T0 to T63, respectively. Also, at that time, as shown in FIG. 4, the control signal S13 is at the low level, and the analog switches SWS0 to SWS62 are in the OFF positions to isolate the reference voltage output terminals T0 and T1, T1 and T2, . . . , and T62 and T63, from each other, respectively, so that the voltages V0 to V63 are output from the reference voltage output terminals T0 to T63, respectively.

On the other hand, as shown in FIG. 4, in a period in which the polarity inversion signal, REV is at the high level (i.e., at the negative polarity drive), the control signal S12 is at the high level, and the analog switches SWLH, SWLL, and SWL63 to SWL0 are in the ON positions. Thus, the second output terminals TL63 to TL0 of the resistors for negative polarity RL64 to RL0 are connected with the reference voltage output terminals T63 to T0, respectively, so that voltages corresponding to the resistance ratio of the resistors for negative polarity RL64 to RL0 are output from the reference voltage output terminals T0 to T63, respectively. At that time, as shown in FIG. 4, the control signal S11 is at the low level, and the analog switches SWH0 to SWH63 are in the OFF positions, so that the first output terminals TH0 to TH63 of the resistors for positive polarity RH0 to RH64 are isolated from the reference voltage output terminals T0 to T63, respectively. Also, at that time, as shown in FIG. 4, the control signal S13 is at the low level, and the analog switches SWS0 to SWS62 are in the OFF positions to isolate the adjacent reference voltage output terminals T0 and T1, T1 and T2, . . . , and T62 and T63, from each other, respectively, so that the voltages V0 to V63 are output from the reference voltage output terminals T0 to T63, respectively.

When the polarity inversion signal REV changes from the low level to the high level, as shown in FIG. 4, a period t1 during which both the control signal S11 and the control signal S12 are at the low level (the control signal S14 is at the low level) is provided. As a result of this, the analog switches SWHH, SWHL, and SWH0 to SWH63 are turned to the OFF positions to reduce the through current from the reference power supply VH to the reference power supply VL. Also, within the period t1 provided at this change of the polarity inversion signal as shown in FIG. 4, a period t2 is provided during which the control signal S13 is at the high level, and short-circuits are thereby established between adjacent ones of the reference voltage output terminals T0 to T63 to distribute the electric charges, so that the charging/discharging currents from the reference power supplies VH and VL generated at the polarity inversion are reduced.

Also when the polarity inversion signal REV changes from the high level to the low level, as shown in FIG. 4, a period t1' during which both the control signal S11 and the control signal S12 are at the low level (the control signal S14 is at the low level) is provided. As a result of this, the analog switches SWLH, SWLL, and SWL63 to SWL0 are turned to the OFF positions to reduce the through current from the reference power supply VH to the reference power supply VL. Also, within the period t1' provided at this change of the polarity inversion signal, as shown in FIG. 4, a period t2' is provided during which the control signal S13 is at the high level, and short-circuits are thereby established between adjacent ones of the reference voltage output terminals T0 to T63 to distribute the electric charges, so that the charging/discharging currents from the reference power supplies VH and VL are reduced.

In the period t2, the control signals S11 and S12 are at the low levels, and the analog switches are thereby in the OFF positions, so that the first and second ladder resistor circuits are isolated from the reference power supplies VH and VL, thus giving no influence on display.

Figure 11:
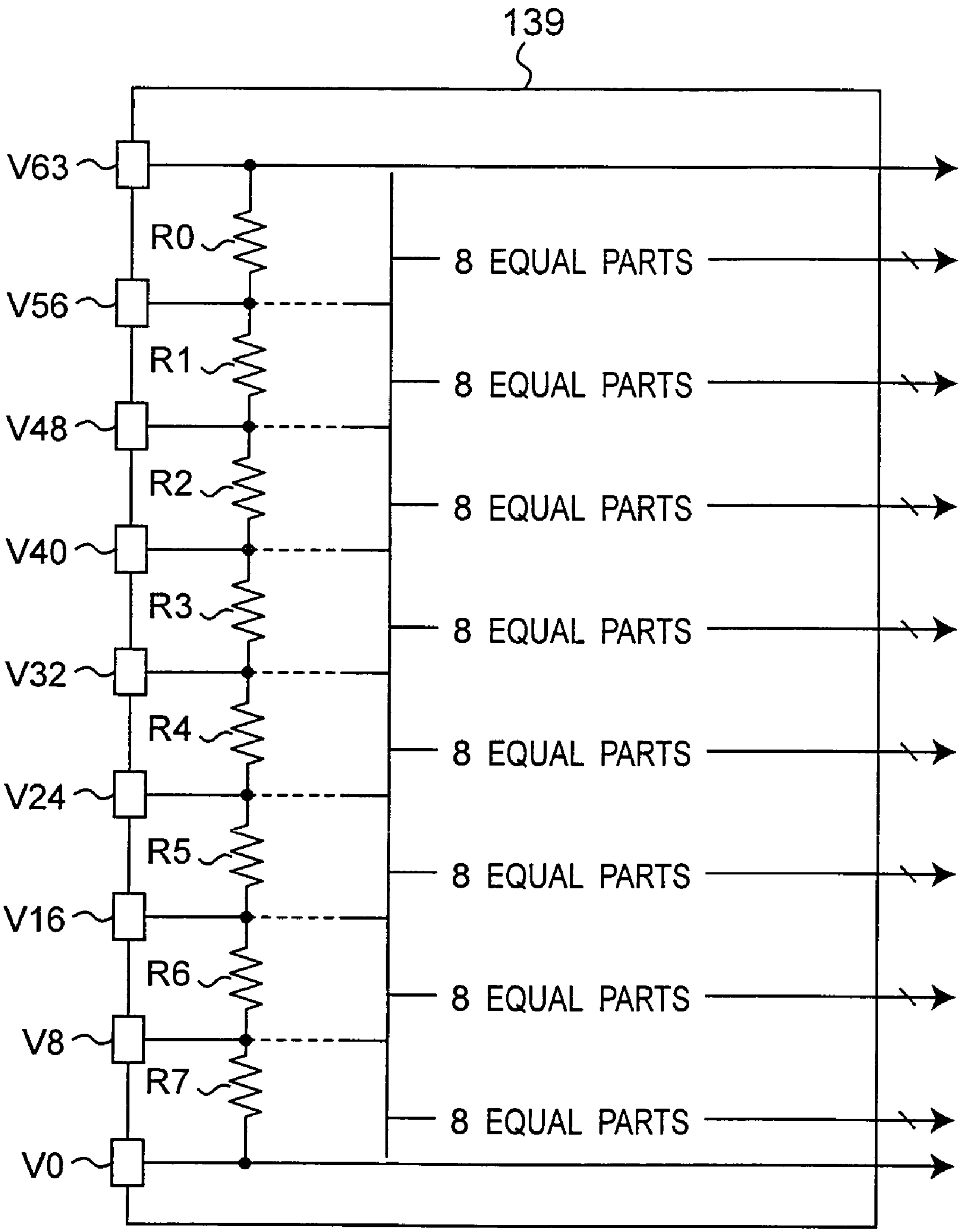
Fig.11 BACKGROUND ART
FIG. 11 shows the configuration of the gradation display reference voltage generating circuit of the source driver.
Figure 12:
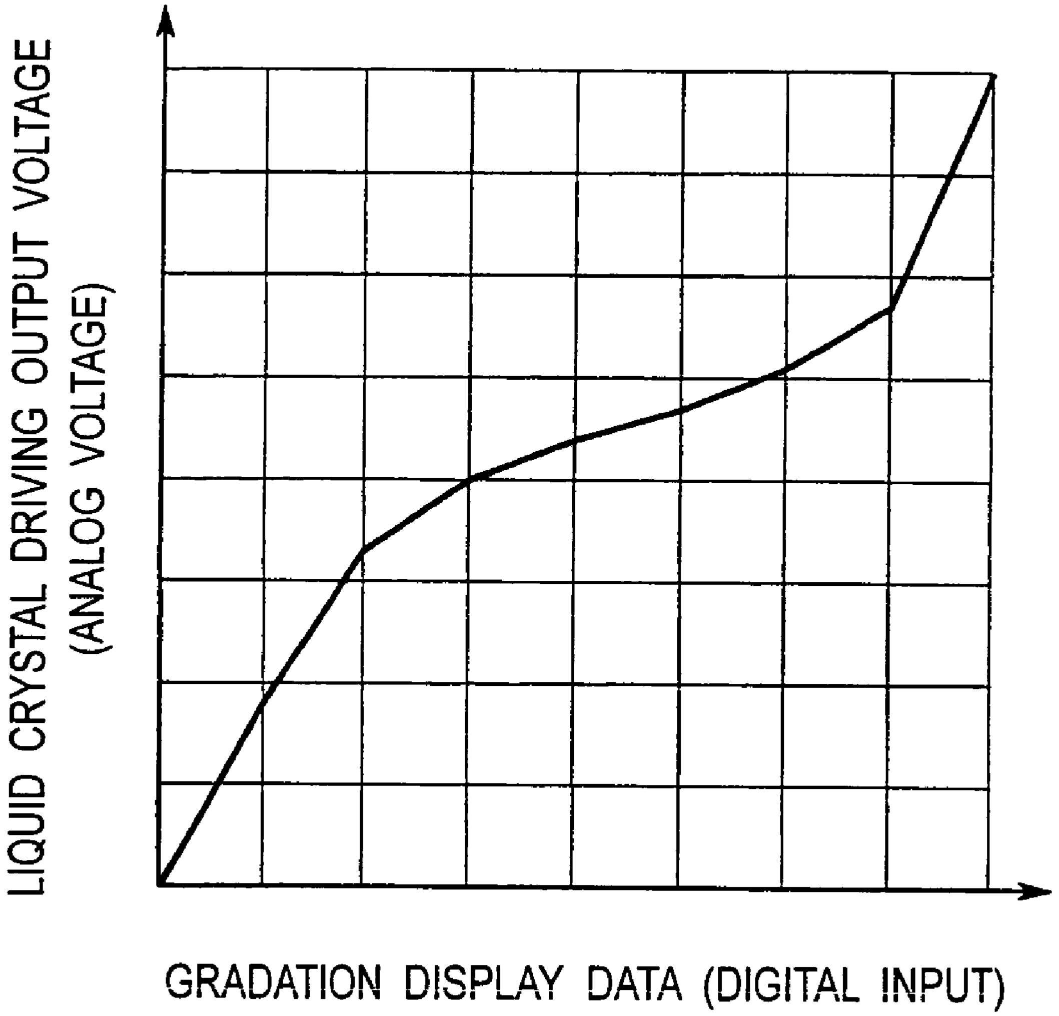
Fig.12 BACKGROUND ART
FIG. 12 shows an example of a characteristic of the liquid crystal driving output voltage of the gradation display reference voltage generating circuit.

As apparent from above, the gradation display reference voltage generating circuit 39 shown in FIG. 3 does not need input of intermediate voltages (V0, V8, V16, V24, V32, V40, V48, V56, and V63), in contrast to the conventional gradation display reference voltage generating circuit 139 shown in FIG. 11, because the resistance values of the two resistance division circuits are designed to match the positive polarity γ characteristic and the negative polarity γ characteristic, respectively so that it is not necessary to input any intermediate voltages to correct the output voltage characteristic.

Figure 5:
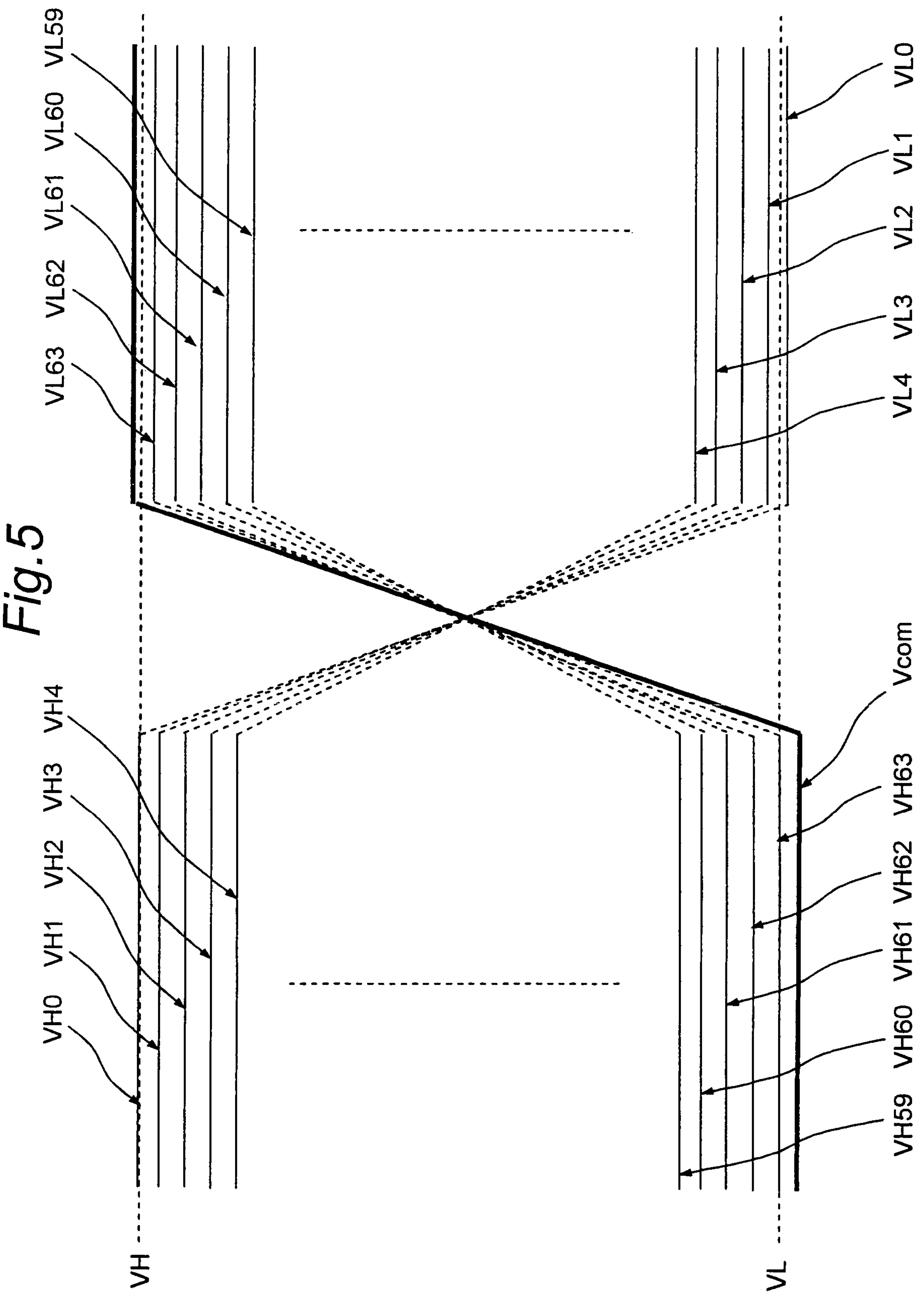
FIG. 5 shows the relation between output voltages of the gradation display reference voltage generating circuit and a common potential at the positive polarity drive, and the relation between the output voltages and the common potential at the negative polarity drive.
Figure 6:
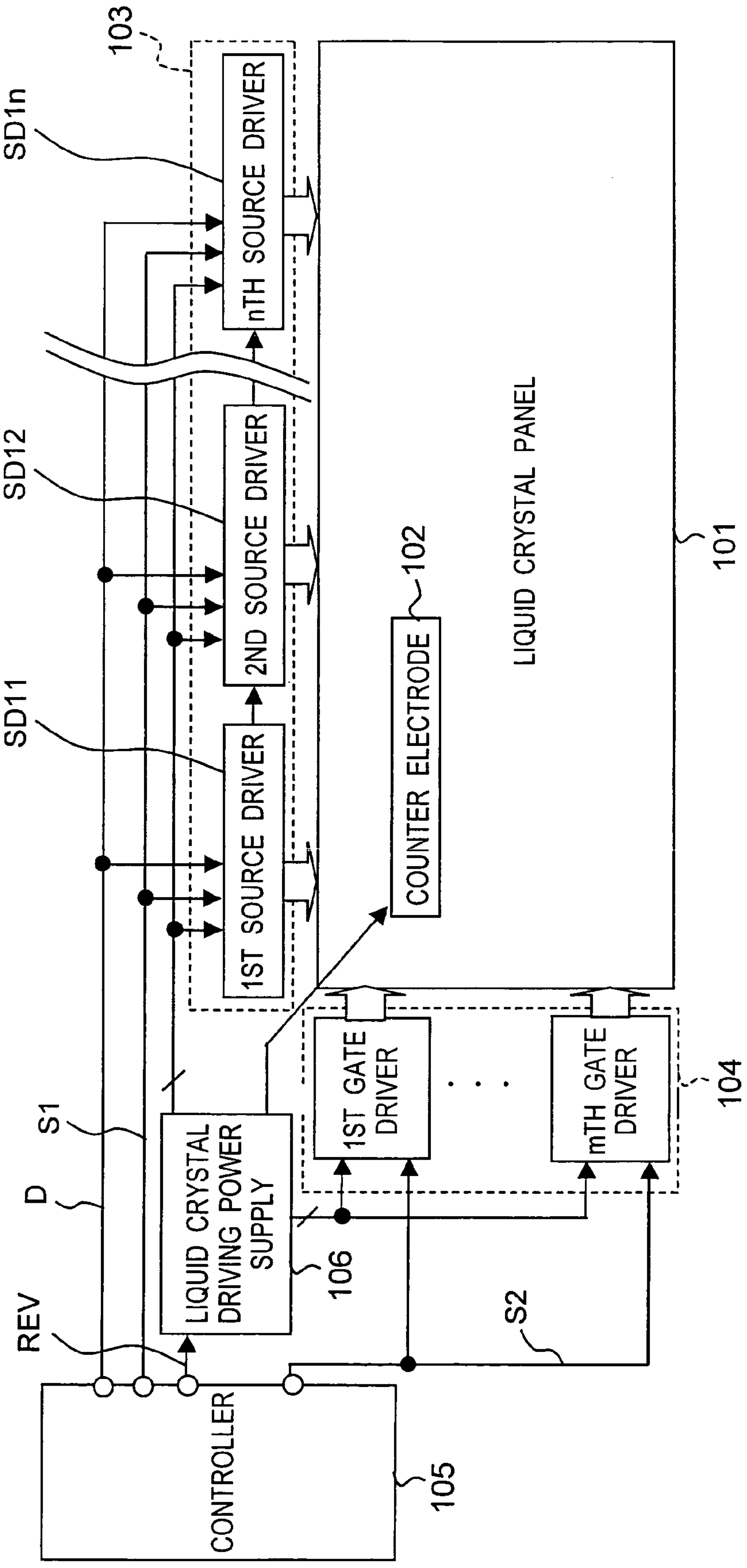
Fig.6 BACKGROUND ART
FIG. 6 is a block diagram showing the configuration of a liquid crystal display device having a liquid crystal driving device that uses a conventional gradation display reference voltage generating circuit.

Furthermore, FIG. 5 shows the relation between output voltages of the gradation display reference voltage generating circuit 39 and a common potential at the positive polarity drive, and the relation between the output voltages and the common potential at the negative polarity drive. The left-half of FIG. 5 shows the output voltages at the positive polarity drive, and the right-half of FIG. 5 shows the output voltages at the negative polarity drive.

As shown in FIG. 5, at the line inversion drive, the common potential Vcom applied to the counter electrode 2 is inverted every horizontal synchronizing period in order to drive the liquid crystal in an alternate fashion, that is, by voltages the polarities of which vary alternately. When the output voltages are on the positive side of the common potential Vcom, the positive polarity drive is carried out, wherein the output voltages VH0 to VH63 are higher than the common potential Vcom, and VH63<VH62< . . . <VH1<VH0. On the other hand, when the output voltages are on the negative side of the common potential Vcom, the negative polarity drive is carried out, wherein the output voltages VL63 to VL0 are lower than the common potential Vcom, and VL0<VL1< . . . <VL62<VL63.

According to the gradation display reference voltage generating circuit 39 as configured above, the first reference voltages VH0 to VH63 produced by the first reference voltage producing section LDH are output from the reference voltage output terminals T0 to T63, respectively, at the positive polarity drive, while the second reference voltages VL0 to VL63 produced by the second reference voltage producing section LDL are output from the reference voltage output terminals T0 to T63, respectively, at the negative polarity drive. Like this, two reference voltage producing sections for producing liquid crystal driving voltages are provided for polarity inversion, and at the positive polarity drive or the negative polarity drive in which one of the reference voltage producing sections is involved, the operation of the other reference voltage producing section unnecessary at the drive is stopped, and thereby the current consumption is reduced. Thus, the footprint of the resistance division circuit and the power consumption can be reduced. In addition, in the gradation display reference voltage generating circuit 39, even if the γ characteristic at the negative polarity drive is different from that at the positive polarity drive, gradation display voltages most suitable for each of the positive polarity drive and the negative polarity drive can be obtained without correcting the gradation display voltages every polarity inversion or adjusting them to levels that would not cause a problem in either polarity. Furthermore, since the gradation display reference voltage generating circuit 39 has the first and second ladder resistor circuits LDH and LDL for producing reference voltages for the positive polarity drive and reference voltages for the negative polarity drive, respectively, the gradation display voltages can be correctly suited to the positive polarity characteristic and the negative polarity characteristic. Furthermore, since it is not required to input intermediate voltages to correct the output voltage characteristic, reference power supply circuits and input terminals for intermediate voltages are not required.

Furthermore, the resistance ratio of the resistors for positive polarity RH0 to RH64 of the first ladder resistor circuit is different from the resistance ratio of the resistors for negative polarity RL0 to RL64 of the second ladder resistor circuit, so that gradation display voltages most suitable for each of the γ characteristic at the positive polarity drive and the γ characteristic at the negative polarity drive can be obtained.

Furthermore, during a predetermined isolation period (t1, t1') upon switching between the positive polarity drive and the negative polarity drive, the reference power supplies VH and VL connected with both ends of the first ladder resistor circuit (resistors for positive polarity RH0 to RH64) of the first reference voltage producing section LDH are isolated from the first ladder resistor circuit by the analog switches SWHH and SWHL (the first power supply isolation section), and the reference power supplies VH and VL connected with both ends of the second ladder resistor circuit (resistors for negative polarity RL0 to RL64) of the second reference voltage producing section LDL are isolated from the second ladder resistor circuit by the analog switches SWLH and SWLL (the second power supply isolation section), so that the through current can be reduced and thus the power consumption can be reduced.

Furthermore, during the predetermined isolation period (t1, t1') upon switching between the positive polarity drive and the negative polarity drive, the first output terminals TH0 to TH63 of the first reference voltage producing section LDH are isolated from the reference voltage output terminals T0 to T63 by the analog switches SWH0 to SWH63 (the first output isolation section), and the second output terminals TL0 to TL63 of the second reference voltage producing section LDL are isolated from the reference voltage output terminals T0 to T63 by the analog switches SWL63 to SWL0 (the second output isolation section), so that the output current can be reduced and thus the power consumption can be reduced.

Furthermore, during a predetermined short-circuit period (t2, t2') upon switching between the positive polarity drive and the negative polarity drive, short circuits are established between adjacent ones of the reference voltage output terminals T0 to T63 to distribute the electric charges of the gradation display voltages produced by resistance division, so that the charging/discharging currents from the reference power supplies generated at polarity inversion can be reduced.

Furthermore, the gradation display reference voltage generating circuit 39 is used in a liquid crystal driving device, so that a liquid crystal display device of low power consumption and good display quality can be realized.

In the above embodiment, a liquid crystal driving device using a gradation display reference voltage generating circuit according to the present invention is described. The gradation display reference voltage generating circuit of the present invention may be applied to driving devices for other display devices which need a plurality of reference voltages for gradation display.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gradation display reference voltage generating circuit for generating reference voltages for gradation display used for digital-to-analog conversion of display data, comprising:

a first reference voltage producing section for producing a plurality of first reference voltages for positive polarity drive with respect to a reference potential of a displaying object;

a second reference voltage producing section for producing a plurality of second reference voltages for negative polarity drive which are opposite in polarity to the plurality of first reference voltages produced by the first reference voltage producing section;

a plurality of reference voltage outputs for outputting the plurality of first reference voltages from the first reference voltage producing section at the positive polarity drive, while outputting the plurality of second reference voltages from the second reference voltage producing section at the negative polarity drive, said first reference voltage producing section comprising a first ladder resistor circuit in which a plurality of first resistance elements are connected in series between two different power supplies and which produces the plurality of first reference voltages by resistance division of a difference in voltage between the two power supplies by the plurality of first resistance elements, and said second reference voltage producing section comprising a second ladder resistor circuit in which a plurality of second resistance elements are connected in series between the two power supplies and which produces the plurality of second reference voltages by resistance division of the difference in voltage between the two power supplies by the plurality of second resistance elements; and a short-circuit section for establishing short circuits between adjacent ones of the plurality of reference voltage outputs during a predetermined short-circuit period upon switching between the positive polarity drive and the negative polarity drive.

2. A gradation display reference voltage generating circuit as claimed in claim 1, wherein a resistance ratio of the plurality of first resistance elements of the first ladder resistor circuit is different from a resistance ratio of the plurality of second resistance elements of the second ladder resistor circuit.

3. A gradation display reference voltage generating circuit as claimed in claim 1, further comprising:

a first power supply isolation section for isolating the power supplies from both ends of the first ladder resistor circuit of the first reference voltage producing section; and a second power supply isolation section for isolating the power supplies from both ends of the second ladder resistor circuit of the second reference voltage producing section.

4. A gradation display reference voltage generating circuit as claimed in claim 3, wherein during a predetermined isolation period upon switching between the positive polarity drive and the negative polarity drive, the first power supply isolation section isolates the power supplies from both ends of the first ladder resistor circuit of the first reference voltage producing section, and the second power supply isolation section isolates the power supplies from both ends of the second ladder resistor circuit of the second reference voltage producing section.

5. A gradation display reference voltage generating circuit as claimed in claim 1 further comprising:

a plurality of first outputs provided at the first reference voltage producing section to output the plurality of first reference voltages;

a plurality of second outputs provided at the second reference voltage producing section to output the plurality of second reference voltages;

a first output isolation section for isolating the plurality of first outputs of the first reference voltage producing section from the plurality of reference voltage outputs; and a second output isolation section for isolating the plurality of second outputs of the second reference voltage producing section from the plurality of reference voltage outputs.

6. A gradation display reference voltage generating circuit as claimed in claim 5, wherein during a predetermined isolation period upon switching between the positive polarity drive and the negative polarity drive, the first output isolation section isolates the plurality of first outputs of the first reference voltage producing section from the plurality of reference voltage outputs, and the second output isolation section isolates the plurality of second outputs of the second reference voltage producing section from the plurality of reference voltage outputs.

7. A liquid crystal driving device comprising a gradation display reference voltage generating circuit as claimed in claim 1.

* * * * *